United States Patent [19]

Maeno et al.

[11] Patent Number: 5,508,580
[45] Date of Patent: Apr. 16, 1996

[54] VIBRATION WAVE DRIVEN MOTOR

[75] Inventors: Takashi Maeno, Yokohama; Takayuki Tsukimoto, Kawasaki; Jun Tamai; Yutaka Maruyama, both of Yokohama, all of Japan

[73] Assignee: Canon Kabushiki Kaisha, Tokyo, Japan

[21] Appl. No.: 296,976

[22] Filed: Aug. 26, 1994

Related U.S. Application Data

[63] Continuation of Ser. No. 8,068, Jan. 22, 1993, abandoned, which is a continuation of Ser. No. 704,865, May 23, 1991, abandoned.

[30] Foreign Application Priority Data

| May 24, 1990 | [JP] | Japan | 2-134316 |
| May 24, 1990 | [JP] | Japan | 2-134317 |
| Aug. 3, 1990 | [JP] | Japan | 2-206597 |
| Oct. 25, 1990 | [JP] | Japan | 2-288135 |

[51] Int. Cl.$^6$ ............................. H01L 41/08; H02N 2/00
[52] U.S. Cl. ................................... 310/323; 310/325
[58] Field of Search ........................... 310/323, 325

[56] References Cited

U.S. PATENT DOCUMENTS

| 3,370,186 | 2/1968 | Antonevich | 310/323 |
| 3,694,675 | 9/1972 | Loveday | 310/323 |
| 4,530,138 | 7/1985 | Ritter | 310/325 |
| 4,633,119 | 12/1986 | Thompson | 310/325 |
| 4,652,786 | 3/1987 | Mishiro | 310/333 |
| 4,659,014 | 4/1987 | Soth et al. | 310/323 |
| 4,692,651 | 9/1987 | Hiramatsu et al. | 310/323 |
| 4,697,117 | 9/1987 | Mishiro | 310/323 |
| 4,728,843 | 3/1988 | Mishiro | 310/325 |
| 4,752,711 | 6/1988 | Tsukimoto et al. | 310/323 |
| 4,757,227 | 7/1988 | Danley et al. | 310/323 |
| 4,871,937 | 10/1989 | Kawai | 310/323 |
| 4,885,499 | 12/1989 | Ueha et al. | 310/323 |
| 4,933,590 | 6/1990 | Inoue et al. | 310/323 |
| 4,965,482 | 10/1990 | Ohnishi et al. | 310/323 |

FOREIGN PATENT DOCUMENTS

| 0406843A2 | 9/1991 | European Pat. Off. | H01L 41/09 |
| 3330411A1 | 3/1985 | Germany | H01L 41/04 |
| 46-32308 | 9/1971 | Japan | 310/325 |
| 62-141980 | 6/1987 | Japan . | |
| 0907798 | 2/1982 | U.S.S.R. | 310/325 |

OTHER PUBLICATIONS

"Development of a Piezo–electric Power Transducer" by G. Venturino et al. Rev. Telegr. Electron. (Argentina), vol. 67, No. 792 (Jan. 1979).

"Design of matching networks for acoustic transducers" by R. Coates et al. Ultrasonics 1988, vol. 26 Mar.

*Primary Examiner*—Thomas M. Dougherty
*Attorney, Agent, or Firm*—Fitzpatrick, Cella, Harper & Scinto

[57] ABSTRACT

According to this invention, a piezo-electric element as an electro-mechanical energy conversion element is urged against a vibration member, and a vibration is excited in the vibration member by a vibration produced in the piezo-electric element. Thus, a contact member, e.g., a rotor which contacts the vibration member, and the vibration member are moved relative to each other. The rigidity of the outer side of the vibration member is larger than that of its inner side.

34 Claims, 11 Drawing Sheets

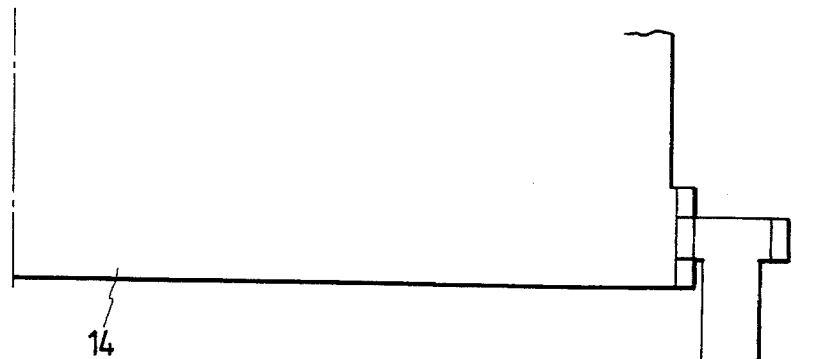
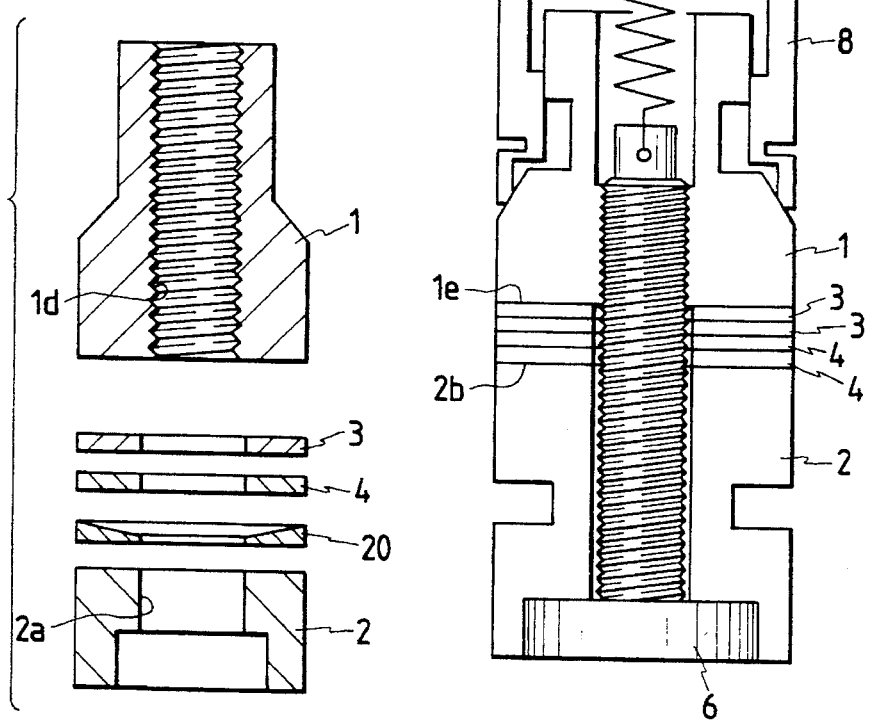

VIBRATION WAVE DRIVEN MOTOR

This application is a continuation of application Ser. No. 08/008,068 filed Jan. 22, 1993, now abandoned, which is a continuation of application Ser. No. 07/704,865 filed May 23, 1991, now abandoned.

BACKGROUND OF THE INVENTION

1. Field of the Invention

The present invention relates to a vibration wave driven motor for supplying electrical energy to an electro-mechanical energy conversion element, such as a piezo-electric element arranged on an elastic member, to vibrate a vibration member constituted by the elastic member and the conversion element, and to cause it to perform circular or elliptic motion about the mass point of the vibration member, thereby frictionally driving a moving member pressed against the vibration member and, more particularly, to a structure of the vibration wave driven motor.

2. Related Background Art

In a conventional vibration wave driven motor, a motor of a type which causes flexural vibration in a ring-like vibration member which is driven with a moving member frictionally engaged with the vibration member relative to each other is put into practical applications, e.g., an AF mechanism for a camera. However, since the motor has a ring-like structure, the cost of a unit including a compression mechanism is unexpectedly high. Thus, such a motor is disadvantageous in terms of cost in applications of motors, which do not require a ring-like structure, or in other words, a hollow structure. For this reason, a rod-like vibration wave driven motor which is of a solid type, and has a simple arrangement of, e.g., a compression system, as shown in FIGS. 4 and 5, has been recently proposed.

The conventional rod-like vibration wave driven motor will be briefly described below.

In FIGS. 4 and 5, a hollow upper vibration member 1 comprises a round metal rod constituted by forming a cone-shaped horn portion 1c between a small-diameter shaft portion 1a as a distal end portion, and a large-diameter shaft portion 1b as a rear end portion. A threaded portion 1d is formed in the inner circumferential surface of an axial hole of the member 1. A lower vibration member 2 comprises a round metal rod formed to have the same outer diameter as the large-diameter shaft portion 1b of the vibration member 1. A bolt insertion hole 2a is formed to coincide with the axis of the vibration member 2. Each of two ring-like piezo-electric element disks 3 and 4 is formed to have the same outer diameter as that of the large-diameter shaft portion 1b. These disks 3 and 4 are arranged between the vibration members 1 and 2 via an electrode disk (not shown). Each of these piezo-electric element disks 3 and 4 is divided into two regions, and these two regions are polarized in different polarities in the direction of thickness. A bolt 6 fastens the vibration members 1 and 2, and is threadably engaged with the threaded portion 1d of the vibration member 1 via the bolt insertion hole 2a of the vibration member 2, thereby clamping and fixing the piezo-electric element disks 3 and 4 between the lower and upper vibration members 2 and 1. One piezo-electric element disk 3 is positionally offset from the other piezo-electric element disk 4 by 90°, and these disks 3 and 4 are arranged in the same direction. The two-divided electrode surface of one piezo-electric element disk 3 opposes the rear end face of the vibration member 1, and the electrode surface of the other piezo-electric element disk 4 opposes the common electrode surface of the piezo-electric element disk 3 via the electrode disk (not shown). The common electrode surface of the other piezo-electric element disk 4 is in contact with the front end face of the lower vibration member 2. When AC voltages $V_1$ and $V_2$ are applied across the two-end portions of the piezo-electric element disks 3 and 4 via the electrode disk, a vibration caused by an expansion/contraction displacement in the direction of thickness of the piezo-electric element disk 3, and a vibration caused by an expansion/contraction displacement in the direction of thickness of the piezo-electric element disk 4 occur. Upon composition of these vibrations, a rod-like vibration member A constituted by the vibration members 1 and 2, and the piezo-electric element disks 3 and 4 is vibrated.

The AC voltages $V_1$ and $V_2$ have the same amplitude and frequency, and have a 90° time phase difference. The piezo-electric element disks 3 and 4 are arranged to be positionally offset by 90° from each other.

Therefore, the vibration member A performs a circular motion around its axis like a skipping rope. When the phases of the voltages $V_1$ and $V_2$ are inverted, the rotation of the circular motion is reversed. Note that the principle of causing the circular or elliptic motion is known to those who are skilled in the art in, e.g., Japanese Patent Appln. Laid-Open No. 62-141980, and a detailed description thereof will be omitted.

In this case, a vibration mode is set such that the loop of the vibration is located at a predetermined position on the horn portion 1c. A rotor R is rotated by frictional contact between the distal end portion of the rotor R frictionally engaged with the distal end portion of the upper vibration member 1, and an antinode portion of the vibration formed in the horn portion 1c. A spring 5 biases the rotor R against the vibration member 1, and is looped between the distal end portion of the bolt 6 and the distal end portion of a hooking pin 7. The hooking pin 7 is mounted on an inner race portion of a thrust bearing 8 attached to one end portion of the rotor R, and applies the biasing force of the spring 5 to the rotor R.

However, in the conventional rod-like vibration wave driven motor, when the piezo-electric element disks 3 and 4 are fastened between the two vibration members 1 and 2 by the bolt 6, the following state occurs, as shown in FIG. 6. That is, a compression stress distribution in a direction perpendicular to the axis of the vibration member A is not uniform, in other words, a strain in the axial direction of the vibration member A in the piezo-electric member disks 3 and 4 is large at the inner periphery side, and is small at the outer periphery side.

Such a state occurs for the following reason. That is, when the piezo-electric element disks 3 and 4 are clamped, the upper and lower vibration members 1 and 2 are elastically deformed, and a stress is concentrated on the inner periphery side near the threaded portion of the bolt 6, in particular, on the inner periphery side of the upper vibration member 1.

For this reason, when the piezo-electric element disks 3 and 4 are clamped by fastening the bolt 6, the piezo-electric element disks 3 and 4 consisting of a piezo-electric ceramic easily crack, and the piezo-electric element disks 3 and 4 cannot be in uniform contact with the vibration members 1 and 2. As a result, vibration characteristics easily vary, resulting in low efficiency of the motor.

SUMMARY OF THE INVENTION

It is an object of the present invention to solve the conventional problems, and to provide a vibration wave driven motor which can clamp piezo-electric element disks without causing a difference in strain, i.e., can make uniform a stress distribution of the piezo-electric element disks, can prevent the piezo-electric element disks from being cracked, and can prevent degradation in vibration characteristics.

It is another object of the present invention to provide an efficient apparatus using a rod-like vibration wave driven motor.

Other objects and features of the present invention will be apparent from the following detailed description of the present invention.

According to one aspect of this invention, a piezo-electric element as an electro-mechanical energy conversion element is urged against a vibration member, and a vibration is excited in the vibration member by a vibration produced in the piezo-electric element. Thus, a contact member, e.g., a rotor which contacts the vibration member, and the vibration member are moved relative to each other. The rigidity of the outer side of the vibration member is larger than that of its inner side.

According to another aspect of this invention, the vibration member has a hollow rod-like shape, and a surface for clamping the piezo-electric element is recessed.

BRIEF DESCRIPTION OF THE DRAWINGS

FIG. 7 is a sectional view showing a lens barrel driving mechanism of an optical lens;

FIG. 8 is an exploded sectional view of a vibration member of a rod-like vibration wave driven motor according to still another embodiment of the present invention;

DETAILED DESCRIPTION OF THE PREFERRED EMBODIMENT

Figure 1:
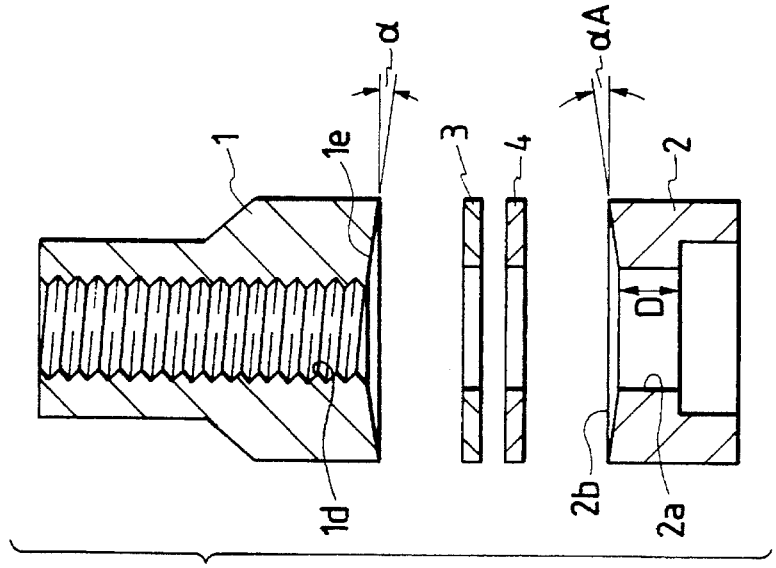
FIG. 1 is an exploded sectional view of a vibration member of a rod-like vibration wave driven motor according to an embodiment of the present invention.

FIG. 1 is an exploded sectional view of a vibration member of a rod-like vibration wave driven motor (to be simply referred to as a vibration wave driven motor hereinafter) according to an embodiment of the present invention.

In the structures of motors in embodiments to be described below, the same reference numerals as in the prior art denote the same parts, and a detailed description thereof will be omitted.

In a vibration member of this embodiment, the same reference numerals denote the same parts as in the prior art for the sake of easy understanding.

In this embodiment, a clamping surface 1e of an upper vibration member 1 for a piezo-electric element disk 3 is formed to be a tapered surface (angle α) having a concave surface, and a clamping surface 2b of a lower vibration member 2 for a piezo-electric element disk 4 is also formed to be a tapered surface (angle αA) having a concave surface.

In the vibration member with this structure, when the piezo-electric element disks 3 and 4 consisting of e.g., PZTs are clamped and fixed between the upper and lower vibration members 1 and 2 by a bolt 6 (not shown). Like in the prior art, the piezo-electric element disks 3 and 4 begin to gradually contact with the members 1 and 2 from the outer peripheral portions of the clamping surfaces 1e and 2b. When the bolt 6 as a fastening member is fastened up to a predetermined value, the clamping surface 1e near a threaded hole 1d of the upper vibration member 1, and the clamping surface 2b near a bolt hole 2a of the lower vibration member 2 suffer from an increased strain. However, since these portions are recessed from the outer circumferential edges, a pressure acting on the piezo-electric element disks 3 and 4 can be made uniform or almost uniform with a compression force by other surface portions, or a compression force on the outer peripheral portions can be slightly increased by the portions with the increased strain.

Since a pressure gradually acts on the piezo-electric element disks 3 and 4 from their outer periphery side upon fastening, and no excessive pressure acts thereon, the piezo-electric element disks 3 and 4 do not easily crack.

The entire surfaces of the piezo-electric element disks 3 and 4 can be compressed with an almost uniform pressure, or a pressure at the outer periphery side can be slightly larger than that at the inner periphery side. Therefore, the piezo-electric element disks 3 and 4 can be free from floating and excessive pressure portions in a driving state, thus improving vibration characteristics and efficiency.

An application position of the fastening force of the bolt 6 on the lower vibration member 2 is separated from the piezo-electric element disk 4 by a distance D. Therefore, the angle αA of the tapered surface is smaller than the angle α of the tapered surface of the vibration member 1.

Figure 3:
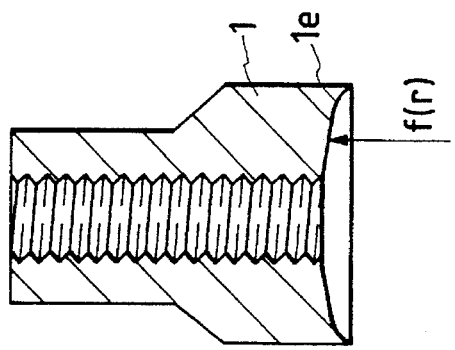
FIGS. 2 and 3 are sectional views of vibration members according to other embodiments of the present invention.
Figure 2:
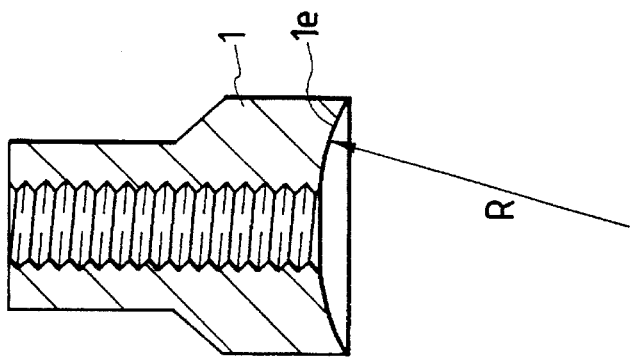

In the embodiment shown in FIG. 1, the clamping surfaces of the upper and lower vibration members 1 and 2 for the piezo-electric element disks are formed to be tapered surfaces having concave surfaces. However, the clamping surfaces may have a spherical shape, as shown in FIG. 2, or may have a curved surface shape for making a strain, i.e., a stress distribution of the piezo-electric element disks 3 and 4 constant, as shown in FIG. 3. In these cases, the strain of the piezo-electric element disks can be made uniform, or a strain of their outer peripheral portions can be slightly larger than that at their inner peripheral portions.

In the embodiment shown in FIG. 3, the concave surface of the clamping surface is formed by a curve f(r) which makes a strain of the piezo-electric elementdisks 3 and 4 constant, or a curve f(r) obtained to make a strain at an outer periphery side slightly larger than that at an inner periphery side. Both curves are obtained by theoretical calculations.

The curve f(r) is constituted by a curve section having a large curvature at an outer periphery side, and a curve section having a small curvature at an inner periphery side.

FIG. 7 shows a structure in which a lens barrel including a photographing lens is driven using the motor according to the present invention.

A gear 12 is coaxially fitted on a moving member 8, and transmits a rotational output to a gear 13, thereby rotating a lens barrel 14 having a gear mated with the gear 13.

In order to detect the rotational position and the rotational speed of the moving member 8 and the lens barrel 14, an optical encoder slit disk 15 is arranged coaxially with the gear 13, and the position and speed are detected by a photocoupler 16.

This mechanism also includes a spring post 9, a bearing 10, and a spring 11 for urging the vibration member against the moving member. Note that two piezo-electric element disks are stacked to increase a vibration amplitude.

According to this embodiment, an axial strain, caused by clamping, of an electro-mechanical energy conversion element such as a piezo-electric element disk can be made uniform at an outer periphery side, or an arbitrary strain distribution can be obtained. Therefore, the piezo-electric element disk does not easily crack upon clamping, and a motor with improved vibration characteristics and efficiency can be obtained.

When such a motor is used as a driving source, a compact, high-precision driving operation can be attained.

In each of the above embodiments, the contact surfaces of the vibration members 1 and 2, which are in contact with the piezo-electric element disks 3 and 4 are formed to be concave contact surfaces to change the rigidity of each vibration member, whereby a strain in the axial direction of the vibration member in the piezo-electric element disks 3 and 4 is consequently made almost uniform. However, as shown in FIG. 8, a plastic spacer 20 may be inserted between the lower vibration member 2 and the piezo-electric element disk 4, or between the upper vibration member 1 and the piezo-electric element disk 3 as well as the former position, thus obtaining the same effect as in each of the above embodiments.

Note that the spacer 20 is a hollow spacer having the same inner diameter as those of the piezo-electric element disks 3 and 4, and its outer peripheral portion is thicker than the inner peripheral portion.

Figure 9:
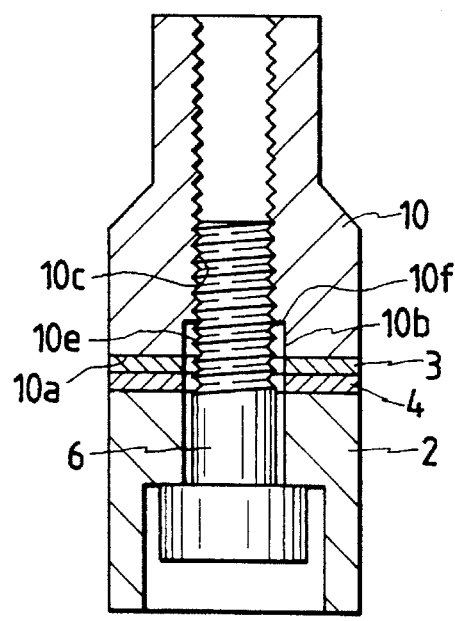
FIGS. 9, 11, 12, 13, 14, and 15 are sectional views of vibration members of vibration wave driven motors according to other embodiments of the present invention.

FIG. 9 is a longitudinal sectional view of a vibration member of a vibration wave driven motor according to still another embodiment of the present invention.

In an upper vibration member 10, a recess portion 10b is formed in an inner portion of an end face 10a contacting a piezo-electric element disk 3. An inner threaded portion 10c which is threadably engaged with a threaded portion of a bolt 6 is formed in the vibration member 10 on the distal end side of the recess portion 10b. In the prior art shown in FIGS. 4 and 5, the end face of the vibration member 1 contacting the piezo-electric element disk 3 coincides in the same plane with a screw end face 1d of the inner threaded portion of the vibration member 1, which portion is threadably engaged with the bolt 6. However, in this embodiment, the end face of the inner threaded portion 10c is separated from the end face contacting the piezo-electric element disk 3 by a distance corresponding to the depth of the recess portion 10b, thereby forming a gap 10e, which is not threadably engaged with the bolt 6, between the inner wall surface of the recess portion 10b and the outer circumferential surface of the bolt 6.

The piezo-electric element disks 3 and 4 are arranged between the end face of a lower vibration member 2 and the end face of the vibration member 10, and are clamped and fixed by the bolt 6 like in the prior art.

More specifically, a portion of the vibration member 10 where stress concentration most easily occurs by fastening the bolt 6 is a corner portion 10f of the bottom portion of the recess portion 10b. However, since the corner portion 10f is separated from the end face 10a of the vibration member 10, which is in contact with the piezo-electric element disk 3, a clamping pressure applied to the piezo-electric element disks 3 and 4 can be made almost uniform.

Figure 10:
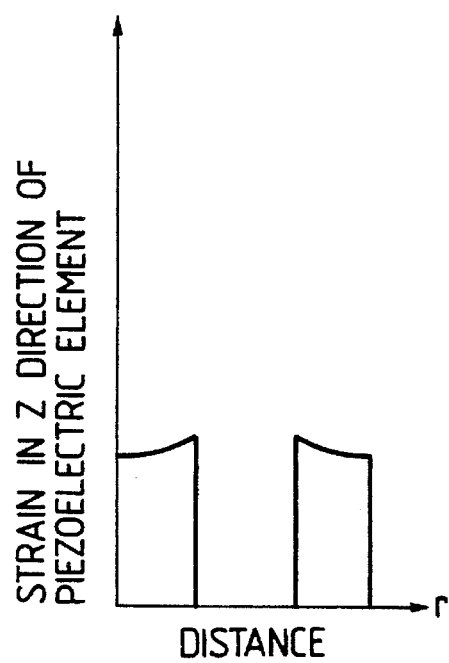
FIG. 10 is a graph showing a strain in an axial direction of a piezo-electric element disk in the embodiment shown in FIG. 9.

Thus, as shown in FIG. 10, compression deformation amounts at the inner and outer periphery sides of the piezo-electric element disks 3 and 4 can be made uniform, and the contact pressure can also be made uniform. Therefore, the piezo-electric element disks 3 and 4 do not easily crack, and a vibration member with good vibration characteristics can be obtained.

In the above-described embodiment shown in FIG. 9, the contact end face of the piezo-electric element disk, and the end face of the inner threaded portion of the vibration member 10 for the bolt 6 are separated from each other in the axial direction by the gap 10e, thereby separating the portion 10f where stress concentration most easily occurs by the bolt 6 from the piezo-electric element disk, thereby averaging the clamping pressure applied to the piezo-electric element disks 3 and 4.

As a structure for separating a portion where stress concentration most easily occurs by a fastened bolt from a piezo-electric element disk in the axial direction, structures shown in FIGS. 11, 12, 13, 14, and 15 are also available in addition to the embodiment shown in FIG. 9.

Figure 4:
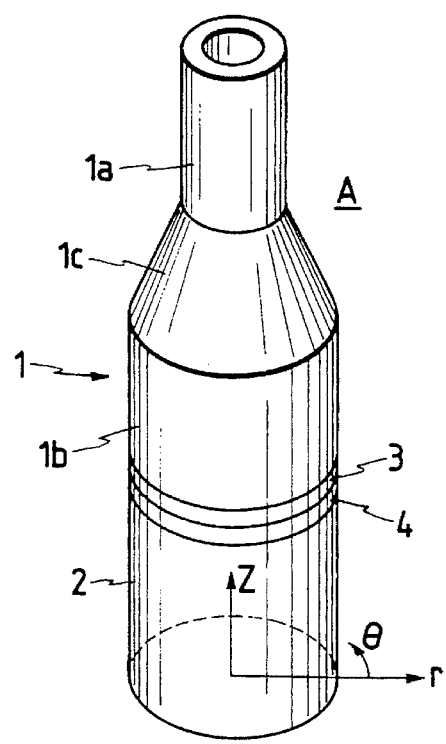
FIG. 4 is a perspective view of a conventional rod-like vibration wave driven motor.
Figure 11:
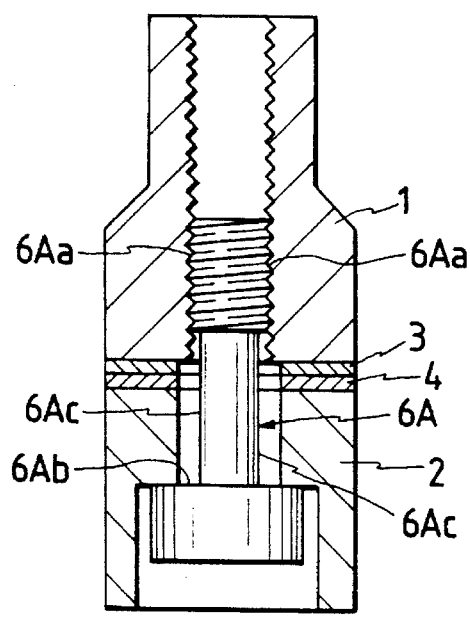

In the embodiment shown in FIG. 11, the piezo-electric element disks 3 and 4 are clamped and fixed between the upper and lower vibration members 1 and 2 using a bolt 6A in place of the bolt 6 in the prior art shown in FIG. 4.

The bolt 6A has a threaded portion 6Aa only on its distal end portion, thereby forming a gap around a shaft portion 6Ac between the threaded portion 6Aa and a head portion 6Ab.

Figure 12:
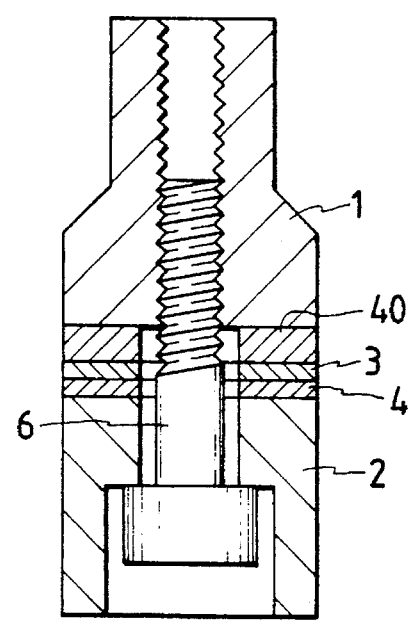

In the embodiment shown in FIG. 12, a ring-like distance plate 40 is interposed between the vibration member 1 and the piezo-electric element disk 3, thereby separating the end face of the vibration member 1 and the piezo-electric element disk 3 in the axial direction.

Figure 13:
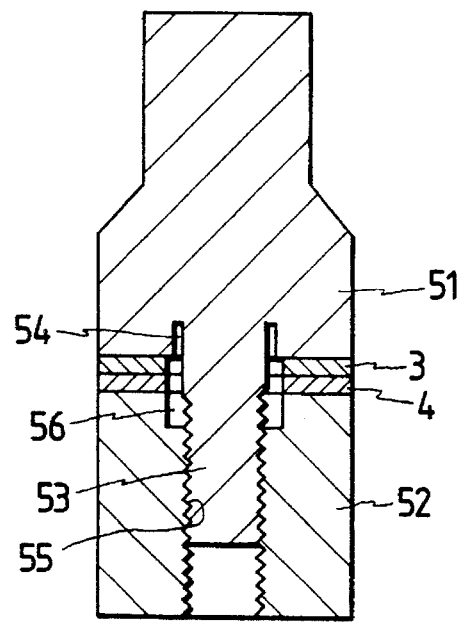

In the embodiment shown in FIG. 13, a threaded portion 53 threadably engaged with a lower vibration member 52 is integrally formed on an upper vibration member 51, and a circumferential groove 54 is formed around the root portion of the threaded portion 53, thereby separating the end face of the vibration member 51, and the proximal end of the threaded portion 53 in the axial direction. In order to separate the end face of the lower vibration member 52 from the end face of a threaded hole 55 to be threadably engaged with the threaded portion 53, a recess portion 56 is formed in the lower vibration member 52.

Figure 14:
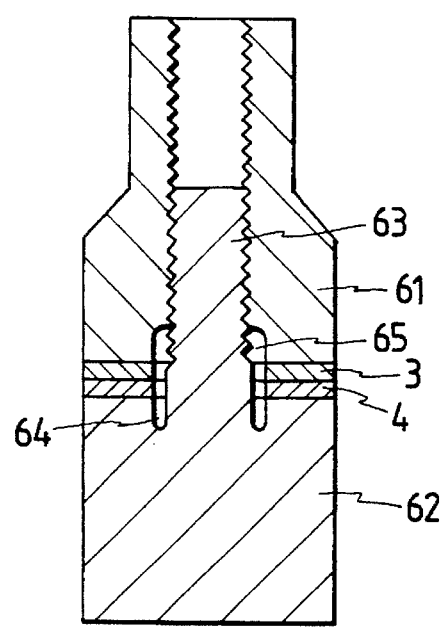

In the embodiment shown in FIG. 14, a threaded portion 63 to be threadably engaged with an upper vibration member 61 is integrally formed on a lower vibration member 62 in contrast to the embodiment shown in FIG. 13.

In this embodiment, in order to locate the proximal end of the threaded portion 63 axially inwardly from the end face of the lower vibration member 62, a circumferential groove 64 is formed like in the embodiment shown in FIG. 13. A recess portion 65 is formed in the upper vibration member 61, thereby separating, in the axial direction, the end face of the vibration member 61 and the end face of a threaded hole 66 to be threadably engaged with the threaded portion 63.

Figure 15:
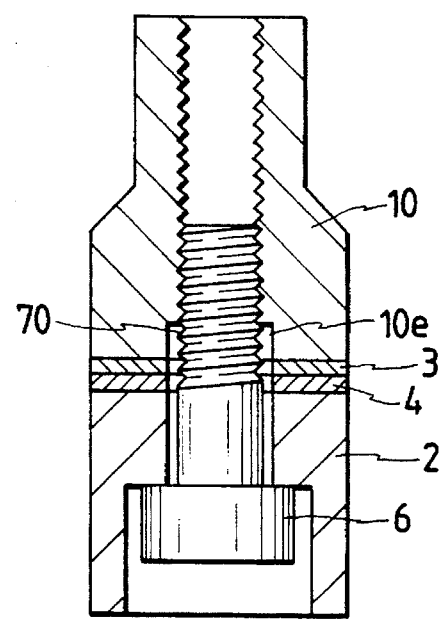

In the embodiment shown in FIG. 15, a member 70 having low rigidity, e.g., felt, rubber, resin, a flexible substrate, or the like is arranged in the gap 10e in the embodiment shown in FIG. 9.

Since the member 70 has low rigidity, a stress is not substantially increased even if strain is produced upon fastening of the bolt 6, thus obtaining the same effect as in the embodiment shown in FIG. 9.

Figure 16:
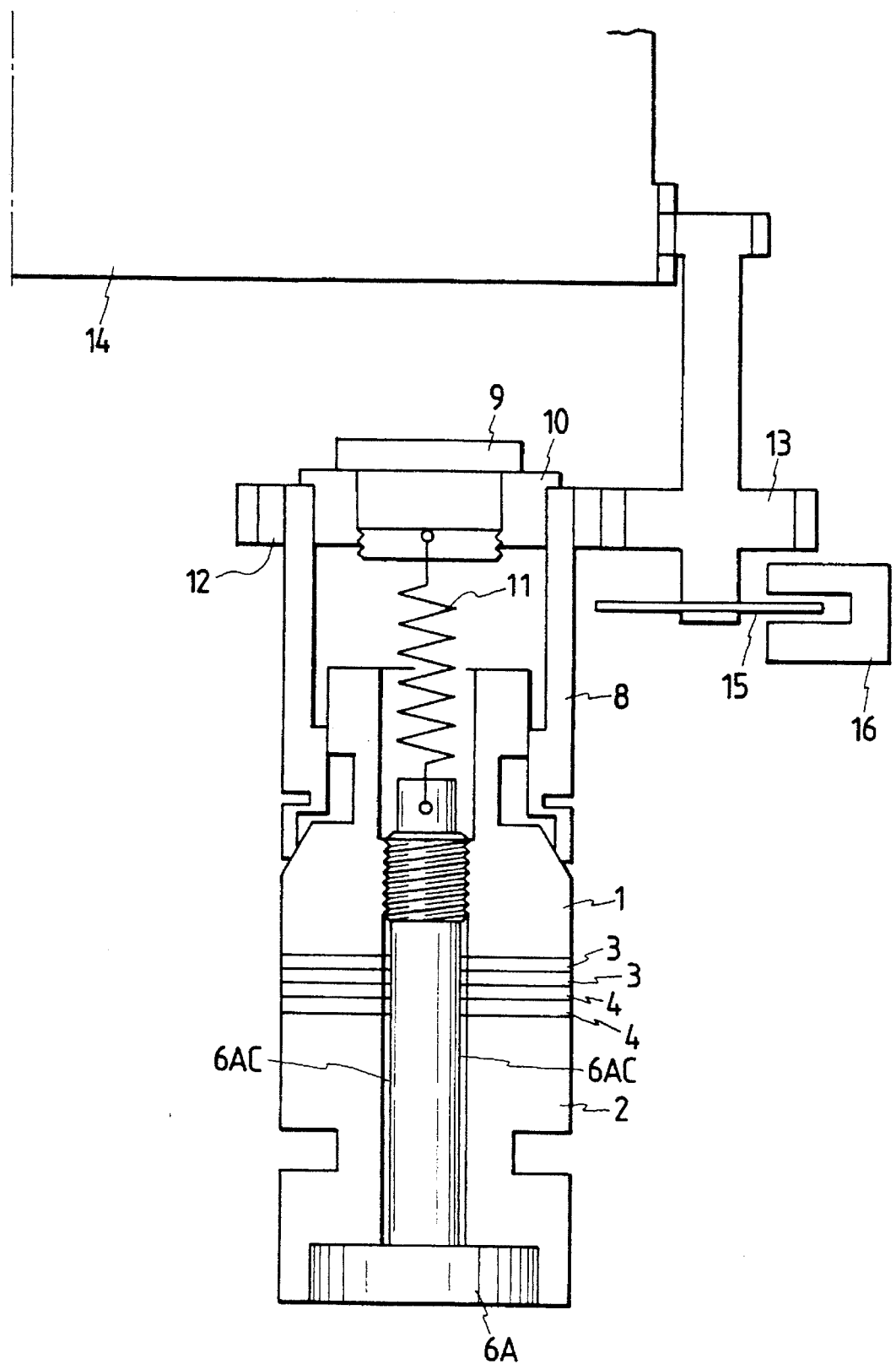
FIG. 16 is a sectional view showing a lens barrel driving mechanism of an optical lens.

FIG. 16 shows a structure in which a lens barrel of an optical lens is driven using the motor according to the embodiment shown in FIG. 11.

Figure 17:
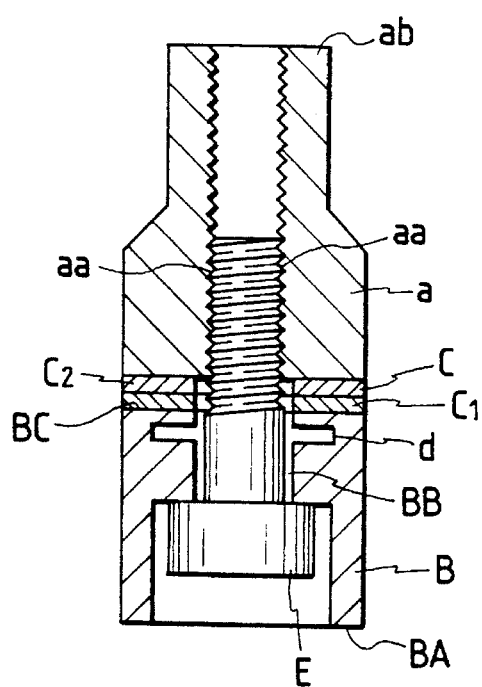
FIG. 17 is a sectional view of a rod-like vibration wave driven motor according to still another embodiment of the present invention.

FIG. 17 shows another embodiment of a vibration wave driven motor according to the present invention. A metal vibration member B similar to a lower vibration member in a conventional motor has a threaded portion BB which is threadably engaged with a bolt E extending to a top portion ab of an upper vibration member a, and has a grooved portion d for increasing the diameter on the inner periphery side of the vibration member B. A bottom portion BA of the lower vibration member B is fixed to a portion of, e.g., a camera or a printer, and its top portion BC opposes a piezo-electric element C as an electro-mechanical energy conversion element, for example, a PZT. The piezo-electric element C is the same as a piezo-electric element of a known vibration wave driven motor, and is constituted by two piezo-electric elements C1 and C2.

Figure 5:
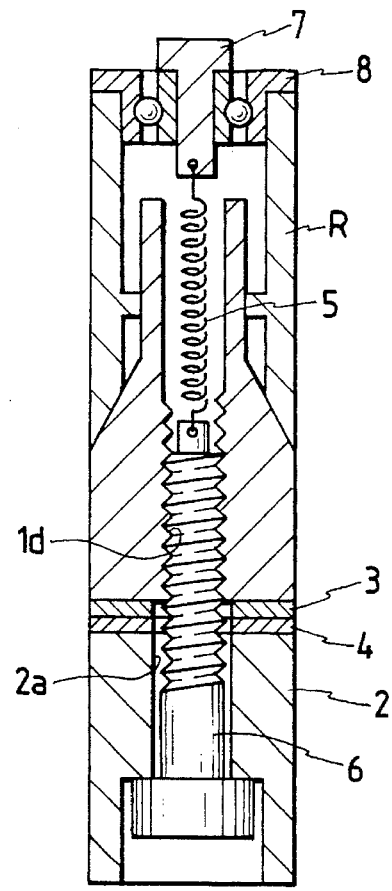
FIG. 5 is a sectional view of the motor shown in FIG. 4.
Figure 6:
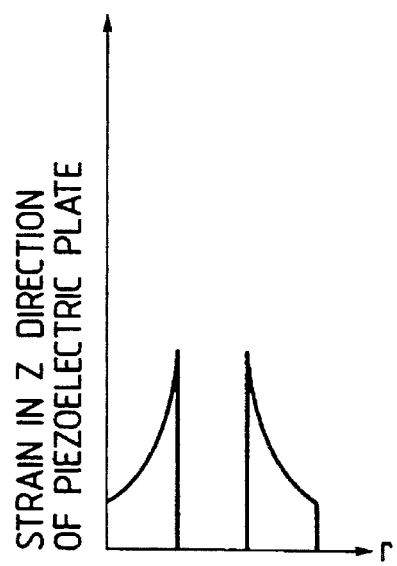
FIG. 6 is a graph showing a strain in a Z direction of a piezo-electric element disk of the motor shown in FIG. 4.

The vibration member a is the same as an upper vibration member of the conventional motor. The bolt E #or clamping the piezo-electric element C by the upper and lower vibration members is substantially the same as a bolt of the conventional motor. A spring (not shown) which is the same as the spring 5 shown in FIG. 5 is attached to the bolt E, as shown in FIG. 5. With this spring, a rotor R (not shown; see FIG. 5) is urged against a portion of the vibration member a. Other constituting elements of the motor are the same as those in the prior art shown in FIGS. 4 and 5, and a detailed description thereof will be omitted.

Figure 18:
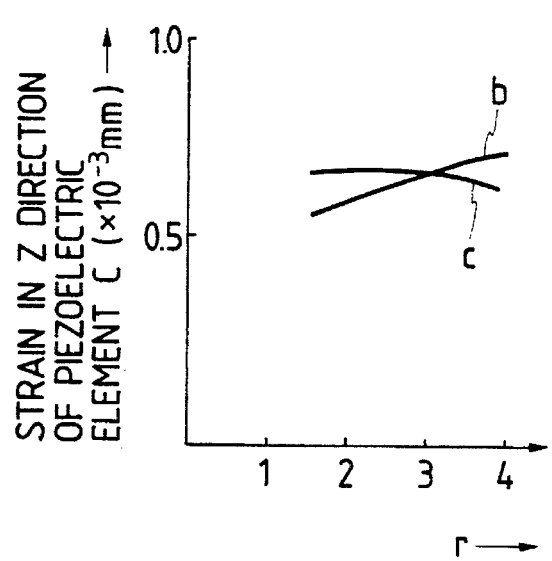
FIG. 18 is a graph showing strain characteristics of a PZT as a piezo-electric element of the motor shown in FIG. 17.

FIG. 18 shows a radial distribution of a strain in a Z direction of the piezo-electric element when the piezo-electric element C is clamped by inserting the bolt E at the center of the vibration members a and B each having an outer diameter of 8 mm, and an inner diameter of 3 mm. In FIG. 18, a curve c represents characteristics when the diameter of the groove of the grooved portion d is 5.5 mm, and a curve b represents characteristics when the diameter of the groove is 6.0 mm. As can be seen from FIG. 18, when the vibration members a and B have the above-mentioned inner and outer diameters, a change in strain of the piezo-electric element C is smallest when the diameter of the groove is 5.5 mm. The operation of the vibration wave driven motor shown in FIG. 17 is the same as that of the conventional motor, and a detailed description thereof will be omitted.

Figure 19:
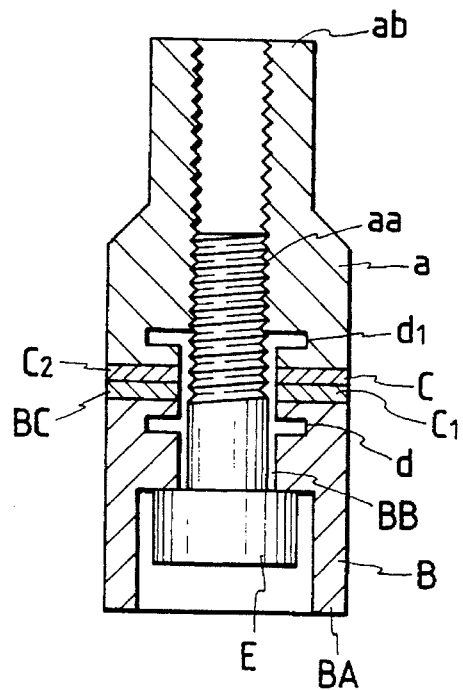
FIGS. 19 to 23 are sectional views of other embodiments of the present invention.

FIG. 19 is a sectional view showing another embodiment of the present invention. In FIG. 19, a grooved portion d1 which is the same as the grooved portion d in FIG. 17 is also formed in an upper vibration member. 10 In the embodiment shown in FIG. 17, since the grooved portion is formed in only the lower vibration member B side, the strain of the PZT as the piezo-electric element is rendered almost constant. However, the PZT is warped in a Z direction (see FIG. 4).

In this embodiment, since the grooved portions d and d1 are formed in the upper and lower vibration members, the warp of the piezo-electric element can be eliminated, and an almost uniform deformation can be attained.

Figure 20:
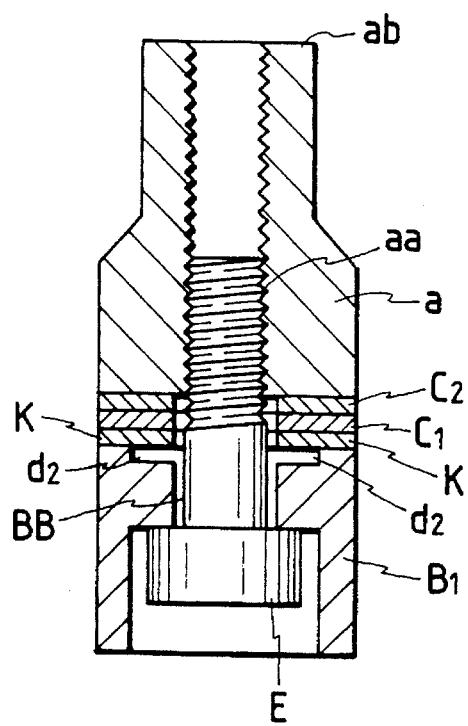

In FIG. 20, a grooved portion similar to that in the above embodiment is constituted by a notched portion d2 and a washer K. With this method, a working process can also be facilitated.

Figure 21:
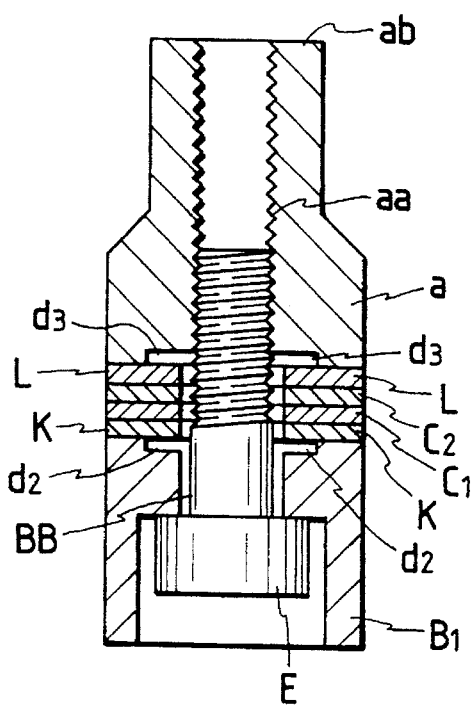

In the embodiment shown in FIG. 21, the same effect as in the embodiment shown in FIG. 20 is attained by a second washer L and a second notched portion d3.

Figure 22:
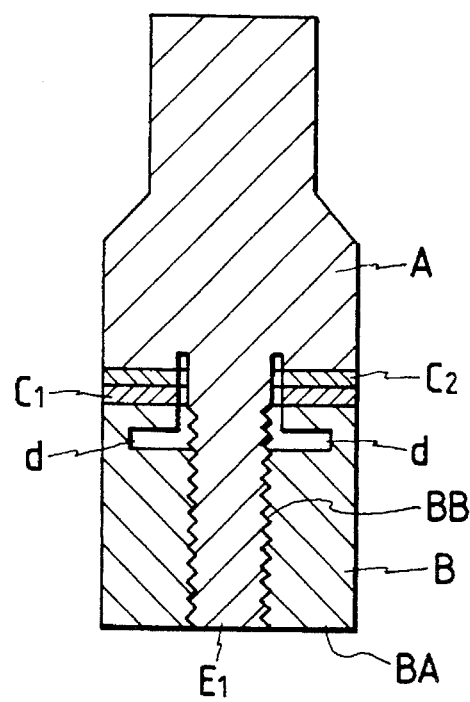

In FIG. 22, a portion of an upper vibration member A is extended to form a bolt E1 to be threadably engaged with the lower vibration member B. Other structures are substantially the same as the embodiment shown in FIG. 17.

Figure 23:
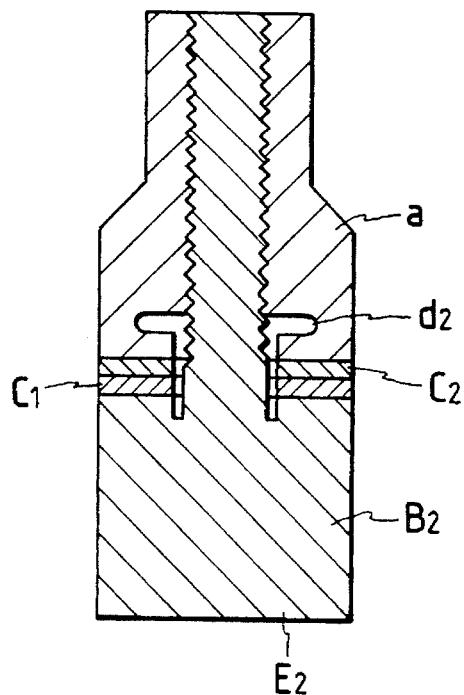

In FIG. 23, a portion of a lower vibration member B2 is extended to form a bolt E2 to be threadably engaged with the upper vibration member a contrary to the embodiment shown in FIG. 22. Other structures are substantially the same as the embodiment shown in FIG. 19, and a detailed description thereof will be omitted.

Needless to say, when the length of the above-mentioned grooved portion or the depth of the notched portion is appropriately adjusted, an arbitrary strain distribution of the piezo-electric element can be obtained.

Other embodiments of the present invention will be described below. In the embodiments to be described below, the shape of a piezo-electric element is changed from that of a conventional one, thereby achieving the objects of the present invention.

Figure 24A:
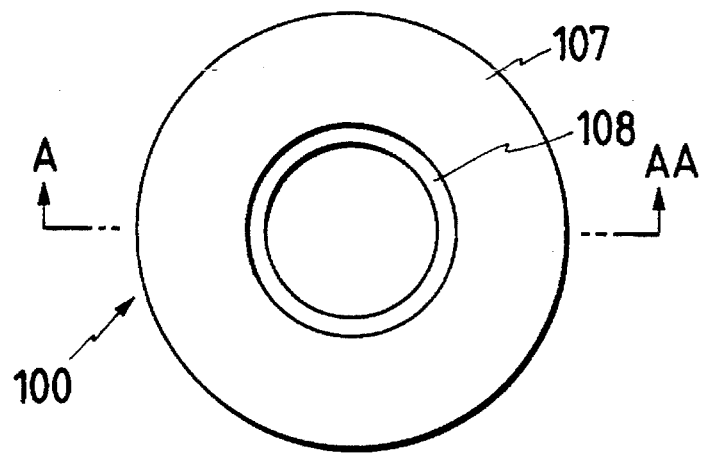
FIGS. 24A and 24B are respectively a plan view showing a piezo-electric element according to still another embodiment of the present invention, and a sectional view taken along a line A—A in FIG. 24A.
Figure 24B:
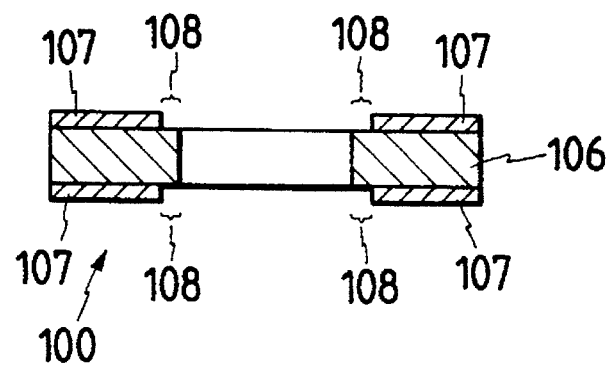

In the embodiment shown in FIGS. 24A and 24B, silver electrode films 107 having a thickness of 2 to 3 μm are respectively formed on the two surfaces of a piezo-electric ceramic 106 having, e.g., an outer diameter of 15 mm, an inner diameter of 6.2 mm, and a thickness of 0.5 mm. The piezo-electric ceramic 106 comprises a three-component-based PZT prepared by adding the third component to a titanate zirconate, and has characteristics having a high mechanical quality coefficient suitable for a vibration wave driven vibration member. The piezo-electric ceramic 106 is a conventional, commercially available one prepared by molding and sintering a powder. The two surfaces of the ceramic 106 are subjected to a lapping treatment, and its inner and outer diameters are finished by a grinding process.

Each electrode film 107 uses silver as a major component, and a commercially available paste consisting of frits and a solvent. These materials are screen-printed on the piezo-electric ceramic 106, and are baked at a temperature of about 800° C.

When an electrode film is formed by screen printing or deposition (to be described later), if the electrode film is formed on the entire surface of a piezo-electric element, the electrode film may extend to the end face of the piezo-electric element. In this case, when a voltage is applied to the piezo-electric element, it is short-circuited by the extended electrode film, and the piezo-electric element can no longer be used.

For this reason, in this embodiment, a portion 108 having a width of 0.1 mm to 0.25 mm where no electrode film is formed, is provided, thereby preventing short-circuiting. When the portion where no electrode film is formed, is formed on a peripheral portion, if the performance of a vibration member is impaired, and if any other problems are posed, a non-formation portion of the electrode film on the inner or outer peripheral portion can be removed by machining, thus solving the above problems.

Figure 30:
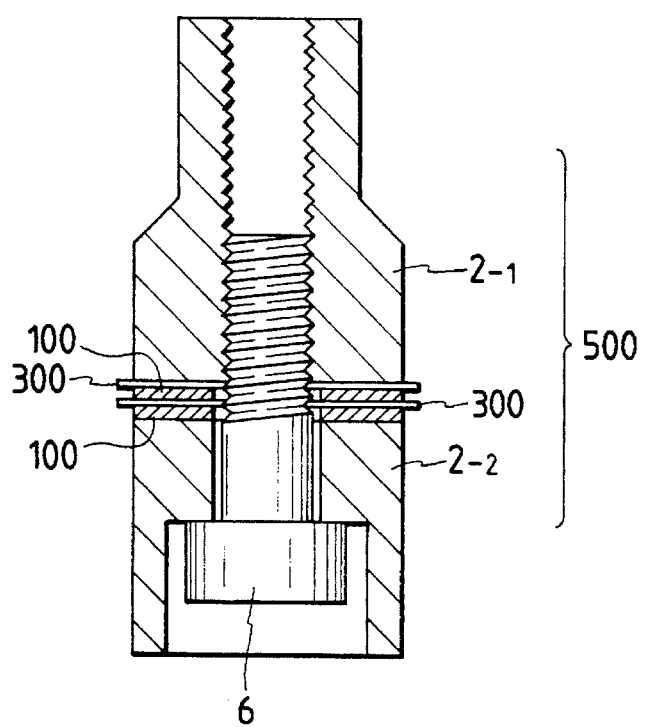
FIG. 30 is a sectional view showing a state wherein the piezo-electric element shown in FIGS. 24A and 24B is assembled in a vibration member of a vibration wave driven motor.

FIG. 30 is a sectional view showing an embodiment in which a vibration member 500 for a vibration wave driven motor is constituted by using a piezo-electric element 100 in the embodiment shown in FIGS. 24A and 24B. Metal members 2-1 and 2-2 formed of brass have the same outer diameter, but have different inner diameters. For example, a female screw portion is formed at the center of one metal member 2-1, while a hollow portion having a diameter (e.g., 6.2 mm) larger than that of the female screw portion is formed at the center of the other metal member 2-2. In this embodiment, the total length of one metal member 2-1 is set to be 25 mm, and that of the other metal member 2-2 is set to be 15 mm. A spot facing portion for an M6 hexagon socket head cap bolt 6 is formed in the other metal member 2-1.

Two electrode plates 300 formed of copper plates are interposed between the two piezo-electric elements 100 and the metal member 2-1, and are fastened by the M6 hexagon socket head cap bolt 6 via the metal members 2-1 and 2-2, thus forming the vibration member 500. Each electrode plate 300 is formed to have an outer diameter of 17.5 mm, an inner diameter of 6.2 mm, and a thickness of 0.2 mm in this embodiment.

In FIGS. 24A and 24B, as compared to the prior art shown in FIG. 4, the non-electrode formation portion 108 where no electrode film is formed, is present on and near the inner peripheral portion of the piezo-electric ceramic, and its radial length is equal to or larger than ½ the thickness of the piezo-electric ceramic.

Various lengths of the non-electrode formation portion 108 were examined. As a result, it was confirmed that there was no effect unless the length was equal to or larger than ½ the thickness of the piezo-electric ceramic.

However, if the length of this portion is too large, the area of the electrode film 107 is decreased, and characteristics of the piezo-electric element 100 are impaired. Therefore, the length of the non-electrode formation portion is preferably as small as possible.

As shown in FIG. 30, when the piezo-electric element 100 shown in FIGS. 24A and 24B is assembled in the vibration member 500, the portion where no electrode film 107 is formed does not directly contact the metal members 2-1 and 2-2 and the electrode plates 300, and does not receive a compression stress. As a result, the compression stress is applied to only the portion where the electrode film is formed.

For this reason, an excessive compression stress on and near the inner peripheral portion is dispersed to the portion where the electrode film 107 is formed, and a compression stress distribution can be made uniform. Furthermore, since the electrode film 107 separated from the inner diameter end of the piezo-electric element 100 receives a pressure, cracking and destruction under pressure of the piezo-electric ceramic 106 can be eliminated. As a result, generation of cracks can be minimized, and the performance of the vibration member 500 will not be impaired.

The minimum thickness of the electrode film 107 is limited to 2 to 3 μm even when contents of frits and a solvent in the paste are adjusted using various fine screens in conventional screen printing. If the thickness of the electrode film is increased, the metal members 2-1 and 2-2, and the piezo-electric ceramic 106 do not directly contact each other. Therefore, the same effect as described above can be obtained.

Furthermore, upon formation of the electrode film, a thinner film may be formed by metal deposition. However, the effect of this embodiment requires a thickness of 0.5 μm or more of the electrode film in practice.

In order to disperse a compression stress acting on and near the inner peripheral portion of the piezo-electric element to the outer peripheral portion, and to prevent cracking, even when the electrode film is slightly formed on the portion 108 where no electrode film is formed, the above-described effect can be expected, if a difference between film thicknesses of the portion 107 where the electrode film is formed on the outer peripheral portion and the electrode film on the inner peripheral portion is 0.5 μm or more enough to disperse the compression stress to the outer peripheral portion.

The material of the electrode film 107 is not limited to silver. For example, platinum, silver-palladium, copper, nickel, and the like may be used.

Figure 25:
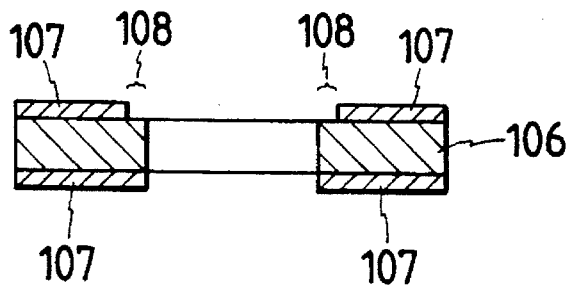
FIG. 25 is a sectional view showing a modification of the embodiment shown in FIGS. 24A and 24B.

In this embodiment, the electrode films 107 are formed on the two surfaces of the piezo-electric ceramic 106 to have the non-electrode formation portions 108. As shown in FIG. 25, the electrode films 107 may be formed to have the non-electrode formation portion 108 on only one surface of the ceramic 106.

Figure 26A:
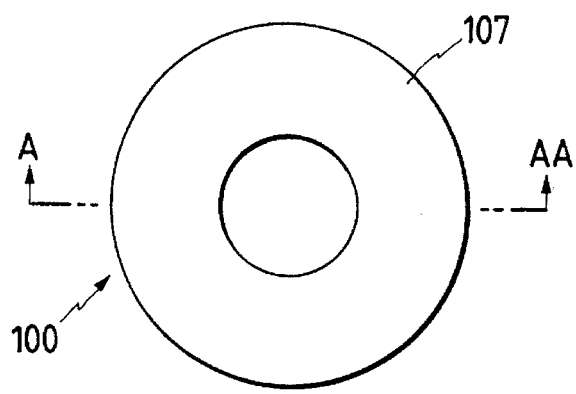
FIGS. 26A and 26B are respectively a plan view showing a piezo-electric element according to still another embodiment of the present invention, and a sectional view taken along a line A—A in FIG. 26A.
Figure 26B:
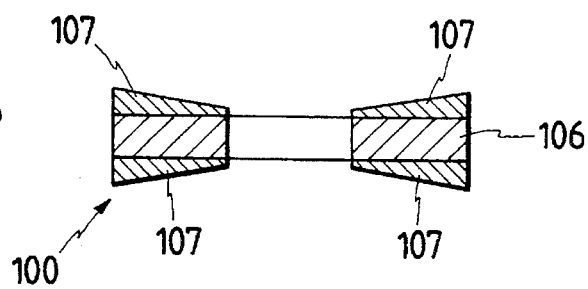

FIG. 26B is a sectional view of a main part of a piezo-electric element according to another embodiment of the present invention.

In the embodiment shown in FIG. 26B, the thickness of each of electrode films 107 formed on two surfaces of a piezo-electric ceramic 106 is increased from the inner periphery side toward the outer periphery side. For example, an electrode film 107 having a thickness of 2 to 3 μm on the inner peripheral portion, and a thickness of 6 to 9 μm on the outer peripheral portion is formed on each surface of the piezo-electric ceramic 106 having, e.g., an outer diameter of 15 mm, an inner diameter of 6.2 mm, and a thickness of 0.5 mm.

Figure 27:
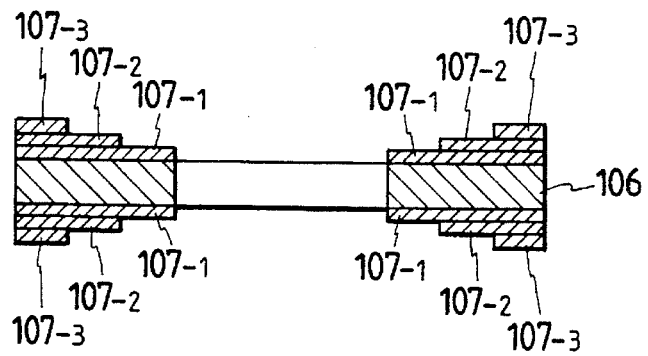
FIGS. 27 and 28 are views for explaining a method of molding a piezo-electric element of the embodiment shown in FIGS. 26A and 26B.

The piezo-electric ceramic 106 comprises a three-component-based PZT prepared by adding the third component to a titanate zirconate, and has characteristics having a high mechanical quality coefficient suitable for a vibration wave driven vibration member. The piezo-electric ceramic 106 is a quite conventional, commercially available one prepared by molding and sintering a powder. The two surfaces of the ceramic 106 are subjected to a lapping treatment, and its inner and outer diameters are finished by a grinding process. Each electrode film 107 uses silver as a major component, and a commercially available paste consisting of frits and a solvent. These materials are screen-printed and stacked on the piezo-electric ceramic 106 several times. FIG. 27 shows a case wherein the electrode films are stacked in three formation processes.

Figure 28:
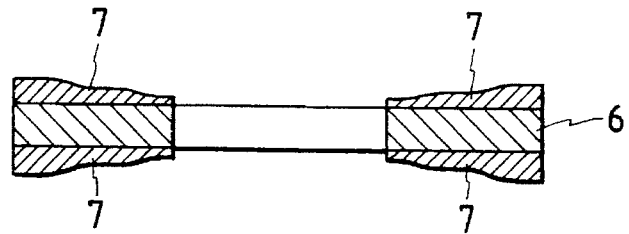

In FIG. 27, in the first electrode film formation process, an electrode film 107-1 is formed by screen printing on the entire surface from the inner periphery toward the outer periphery. In the second electrode film formation process, an electrode film 107-2 is formed by screen printing on the electrode film 107-1 from a position offset from the inner periphery to the outer periphery by 3 mm toward the outer peripheral edge. In the third electrode film formation process, an electrode film 107-3 is formed by screen printing on the electrode film 107-2 from a position offset by 3 mm from the above-mentioned offset position to the outer peripheral edge. After printing, the formed films are baked at a temperature of about 800° C. As a result, the electrode films 107 whose total thickness is smoothly increased from the inner periphery side toward the outer periphery side can be obtained, as shown in the sectional view of the piezo-electric element in FIG. 28.

The thickness of the electrode film is as described above. In order to change the thickness of the electrode film, screen printing need only be performed several times. If the number of times of screen printing is increased, this requires troublesome operations, and corner portions of the electrode films formed by printing tend to be rounded upon baking. When printing was performed three times using three different screens, almost smooth changes in thickness could be obtained.

In addition to the above method, in order to change the thickness of the electrode film 107, the thickness of a resin film of a screen may be continuously changed to form the film in single screen printing.

The present inventors examined various changes in thickness in addition to this embodiment. However, the thickness of the electrode film formed by screen printing is limited to a minimum of 2 to 3 μm, and in order to provide a smooth change in thickness from the inner peripheral portion toward the outer peripheral portion, screen printing must be performed about three times. For this reason, the thickness of this embodiment is a minimum thickness of the electrode film 107 which can be formed by the screen printing method.

As a formation method of the electrode film 107, a metal deposition method may be performed several times using masks having different sizes like in the screen printing method.

Of course, the piezo-electric element 100 formed in this manner can be used in the vibration member shown in FIG. 30.

Figure 29A:
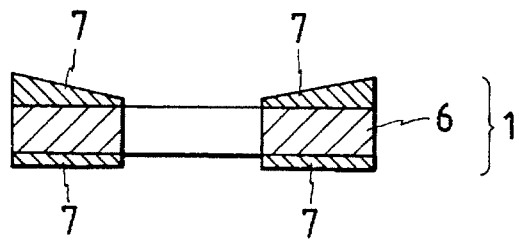
FIGS. 29A and 29B are sectional views showing modifications of the embodiment shown in FIGS. 26A and 26B.
Figure 29B:
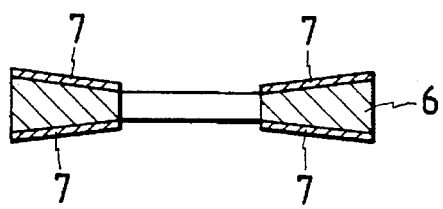

As shown in FIG. 29A, an inclined electrode film may be formed on only one side, or as shown in FIG. 29B, the piezo-electric ceramic 106 may be tapered by a machining process, a grinding process, or a polishing process, and an electrode film having a uniform thickness may be formed, so that the thickness of the piezo-electric element itself can be apparently increased from the inner periphery side toward the outer periphery side.

As described above, according to the present invention, a compression stress acting on the piezo-electric element can be made uniform, and cracks which may be produced in the piezo-electric element can be prevented.

Since the compression stress is made uniform, the piezo-electric element can be fastened by a larger fastening force.

We claim:
1. A vibrating device comprising:
a first vibrating member having a hollow portion;
a second vibrating member having a hollow portion;
an electro-mechanical energy conversion member having a hollow portion, and disposed between said first and second vibrating members, said conversion member being arranged for generating a flexural vibration in said first and second vibrating members in response to an applied electrical signal;
a fastening member disposed in the hollow portions of said first and second vibrating members and said conversion member, for clamping said conversion member between said first and second vibrating members; and
tapered recess means for distributing a compression stress acting on said conversion member, wherein said compression stress is substantially uniform when said conversion member is clamped between said first and second vibrating members by said fastening member.
2. A vibrating device according to claim 1, wherein said first vibrating member is formed of an elastic member.
3. A vibrating device according to claim 1, wherein said second vibrating member is formed of an elastic member.
4. A vibrating device according to claim 1, wherein said fastening member comprises a bolt, and the hollow portion of said first vibrating member has a threaded portion which is threadably engaged with said bolt.
5. A vibrating device according to claim 1, wherein said first vibrating member has contact surface contacting said conversion member, and wherein said tapered recess means comprises a recess formed in an inner peripheral portion of said contact surface of said first vibrating member.
6. A vibrating device according to claim 5, wherein said recess has a spherical shape.
7. A vibrating device according to claim 5, wherein said recess has a curved-surface shape.
8. A vibrating device according to claim 1, wherein said tapered recess means comprises a spacer member provided between one of said first and second vibrating members and said conversion member, and wherein an uncompressed thickness of an inner portion of said spacer member is thinner than an uncompressed thickness of an outer portion of said spacer member.
9. A vibration driven system comprising:
a first vibrating member having a hollow portion;
a second vibrating member having a hollow portion;
an electro-mechanical energy conversion member having a hollow portion, and disposed between said first and second vibrating members, said conversion member being arranged for generating a flexural vibration in said first and second vibrating members in response to an applied electrical signal;
a fastening member disposed in the hollow portions of said first and second vibrating members and said conversion member, for clamping said conversion member between said first and second vibrating members;
tapered recess means for distributing a compression stress acting on said conversion member, wherein said compression stress is substantially uniform when said conversion member is clamped between said first and second vibrating members by said fastening member; and
contact member for contacting said first vibrating member, wherein said first vibrating means drives said contact member by frictional contact therewith when a flexural vibration is generated in said first vibrating member.

10. A vibration driven system comprising:

a first vibrating member having a hollow portion;

a second vibrating member having a hollow portion;

an electro-mechanical energy conversion member having a hollow portion, and disposed between said first and second vibrating members, said conversion member being arranged for generating a flexural vibration in said first and second vibrating members in response to an applied electrical signal;

a fastening member disposed in the hollow portions of said first and second vibrating members and said conversion member, for clamping said conversion member between said first and second vibrating members;

stepped recess means for distributing a compression stress acting on said conversion member, wherein said compression stress is substantially uniform when said conversion member is clamped between said first and second vibrating members; and a contact member for contacting said first vibrating member, wherein said first vibrating member drives said contact member by frictional contact therewith when a flexural vibration is generated in said first vibrating member.

11. A vibrating device comprising:

a first vibrating member having a hollow portion;

a second vibrating member having a hollow portion;

an electro-mechanical energy conversion member having a hollow portion, and disposed between said first and second vibrating members, said conversion member being arranged for generating a flexural vibration in said first and second vibrating members in response to an applied electrical signal;

a fastening member disposed in the hollow portions of said first and second vibrating members and said conversion member, for clamping said conversion member between said first and second vibrating members; and compression stress distributing means, including recess formed at an inner peripheral portion of at least one of said first vibrating members and said second, vibrating members for distributing a compression stress acting on said conversion member when said conversion member is clamped between said first and second vibrating members by said fastening member.

12. A vibrating device according to claim 11, wherein said recess is formed in said first vibrating member.

13. A vibrating device according to claim 11, wherein said recess is formed in said second vibrating member.

14. A vibrating device according to claim 11, wherein a first recess is formed in said first vibrating member and a second recess is formed in said second vibrating member.

15. A vibrating device according to claim 11, wherein said recess is adjacent to the hollow portion of said at least one vibrating member.

16. A vibrating device according to claim 11, wherein said recess forms a gap adjacent said electro-mechanical energy conversion member.

17. A vibrating device according to claim 14, wherein the first recess formed in said first vibrating member forms a gap adjacent a first side of said electro-mechanical energy conversion member, and the second recess formed in said second vibrating member forms a gap adjacent a second side of said electro-mechanical energy conversion member.

18. A vibrating device comprising:

a first vibrating member having a hollow portion;

a second vibrating member having a hollow portion;

an electro-mechanical energy conversion member having a hollow portion, and disposed between said first and second vibrating members, said conversion member being arranged for generating a flexural vibration in said first and second vibrating members in response to an applied electrical signal;

a fastening member disposed in the hollow portions of said first and second vibrating members and said conversion member, for clamping said conversion member between said first and second vibrating members; and compression stress distributing means for distributing a compression stress acting on said conversion member, wherein said compression stress is substantially uniform when said conversion member is clamped between said first and second vibrating members by said fastening member;

wherein said compression stress distributing means comprises a spacer member having a hollow portion and at least one recess formed in said spacer member, said spacer member being insertable between said electro-mechanical energy conversion member and one of said first and second vibrating members.

19. A vibrating device according to claim 18, wherein said spacer member comprises a recess formed on a side contacting said one vibrating member.

20. A vibrating device according to claim 18, wherein said spacer member comprises a recess formed on a side contacting said electro-mechanical energy conversion member.

21. A vibrating device according to claim 18, wherein said spacer member comprises a first recess formed on a first side contacting said one vibrating member, and a second recess formed on a second side contacting said electro-mechanical energy conversion member.

22. A vibration device according to claim 18, wherein said spacer member comprises a tapered recess.

23. A vibrating device according to claim 18, wherein said spacer member comprises a stepped recess.

24. A vibrating device comprising:

a first vibrating member having a hollow portion;

a second vibrating member having a hollow portion;

an electro-mechanical energy conversion member having a hollow portion, and disposed between said first and second vibrating members, said conversion member being arranged for generating a flexural vibration in said first and second vibrating members in response to an applied electrical signal;

a fastening member disposed in the hollow portions of said first and second vibrating members and said conversion member, for clamping said conversion member between said first and second vibrating members; and compression stress distributing means for distributing a compression stress acting on said conversion member, wherein said compression stress is substantially uniform when said conversion member is clamped between said first and second vibrating members by said fastening member;

wherein said electro-mechanical energy conversion member comprises at least one recess constituting said compression stress distributing means.

25. A vibrating device according to claim 24, wherein said electro-mechanical energy conversion member comprises a recess formed on a side contacting said first vibration member.

26. A vibrating device according to claim 24, wherein said electro-mechanical energy conversion member comprises a recess formed on a side contacting said second vibrating member.

27. A vibrating device according to claim 24, wherein said electro-mechanical energy conversion member comprises a first recess formed on a side contacting said first vibrating member and a second recess on a side contacting said second vibrating member.

28. A vibrating device according to claim 24, wherein said electro-mechanical energy conversion member comprises a tapered recess.

29. A vibrating device according to claim 28, wherein said tapered recess is formed by an electro-mechanical film layer of said electro-mechanical energy conversion member.

30. A vibrating device according to claim 27, wherein said first and second recesses are tapered recesses formed by respective electro-mechanical film layers of said electro-mechanical energy conversion member.

31. A vibrating device according to claim 24, wherein said electro-mechanical energy conversion member comprises a stepped recess.

32. A vibrating device according to claim 31, wherein said stepped recess is formed by an electro-mechanical film layer of said electro-mechanical energy conversion member.

33. A vibrating device according to claim 27, wherein said first and second recesses are stepped recesses formed by respective electro-mechanical film layers of said electro-mechanical energy conversion member.

34. A vibrating device comprising:

a first vibrating member having a hollow portion;

a second vibrating member having a hollow portion;

an electro-mechanical energy conversion member having a hollow portion, and disposed between said first and second vibrating members, said conversion member being arranged for generating a flexural vibration in said first and second vibrating members in response to an applied electrical signal;

a fastening member disposed in the hollow portions of said first and second vibrating members and said conversion member, for clamping said conversion member between said first and second vibrating members; and stepped recess means for distributing a compression stress acting on said conversion member, wherein said compression stress is substantially uniform when said conversion member is clamped between said first and second vibrating members by said fastening member.

* * * * *

UNITED STATES PATENT AND TRADEMARK OFFICE
CERTIFICATE OF CORRECTION

PATENT NO. : 5,508,580          Page 1 of 2
DATED      : April 16, 1996
INVENTOR(S): TAKASHI MAENO, ET AL.

It is certified that error appears in the above-indentified patent and that said Letters Patent is hereby corrected as shown below:

Column 1

Line 42, "1a" should read --*1a*--.

Column 4

Line 39, "Like" should read --, like--.

Column 5

Line 17, "elementdisks" should read --element disks--.

Column 7

Line 51, "#or" should read --for--.

Column 8

Line 14, "member. 10Inthe" should read --member. ¶In the--.

UNITED STATES PATENT AND TRADEMARK OFFICE
CERTIFICATE OF CORRECTION

PATENT NO. : 5,508,580

DATED : April 16, 1996

INVENTOR(S) : TAKASHI MAENO, ET AL.

It is certified that error appears in the above-indentified patent and that said Letters Patent is hereby corrected as shown below:

Column 10

Line 31, "more" should read --more,--.

Column 12

Line 29, "has" should read --has a--.
Line 65, "contact" should read --a contact--.

Column 13

Line 40, "including" should read --including a--.
Line 41, "formed" should read --formed only--.
Line 43, "members" should read --members,--.

Signed and Sealed this

Sixth Day of August, 1996

Attest:

BRUCE LEHMAN

Attesting Officer   Commissioner of Patents and Trademarks